United States Patent

[11] 3,581,558

| [72] | Inventors | John P. Porter |
| | | Cuyahoga Falls; |
| | | Alan G. Veith, Copley, both of, Ohio |
| [21] | Appl. No. | 691,306 |
| [22] | Filed | Dec. 18, 1967 |
| [45] | Patented | June 1, 1971 |
| [73] | Assignee | The B.F. Goodrich Company |
| | | New York, N.Y. |

[54] TEST INSTRUMENT FOR DETERMINING THE SHEAR MODULUS OF ELASTOMERIC MATERIALS
13 Claims, 6 Drawing Figs.

[52] U.S. Cl.................................................. 73/101,
73/15.6, 73/59
[51] Int. Cl.................................................. G01n 3/24,
G01n 11/00
[50] Field of Search.......................................... 73/101, 99,
15.6, 59, 60, 9, 421; 340/411, 412, 413, 213, 220,
223, 420, 181, 183

[56] References Cited
UNITED STATES PATENTS
| 3,182,494 | 5/1965 | Beatty | 73/101 |
| 3,090,223 | 5/1963 | Juffa | 73/59 |
| 3,053,079 | 9/1962 | Miller | 73/60 |
| 3,034,051 | 5/1962 | Higgins | 324/73 |
| 2,905,520 | 9/1959 | Anderson | 346/34 |
| 2,883,255 | 4/1959 | Anderson | 346/34 |
| 2,901,739 | 8/1959 | Freitas | 340/213 |
| 3,068,450 | 12/1962 | Fletcher | 340/149 |
| 3,196,403 | 7/1965 | Ivins | 340/172.5 |
| 3,217,306 | 11/1965 | Hillman | 340/181 |
| 3,336,478 | 8/1967 | Franklin | 250/83.3 |

*Primary Examiner*—Richard C. Queisser
*Assistant Examiner*—John Whalen
*Attorneys*—Joseph Januszkiewicz and W.A. Shira, Jr.

ABSTRACT: An instrument having a quality control circuit for testing the dynamic shear modulus of elastomeric material which is operable to give indications of the deviation of the characteristics of a material under test from a standard characteristic curve. The indication may be given as a series of colored signal lamps controlled by time delayed circuits or as a printed tape with numerical values for comparison with numerical values of a standard characteristic curve.

INVENTORS
JOHN P. PORTER
ALAN G. VEITH
BY Joseph Januszkiewicz
ATTY.

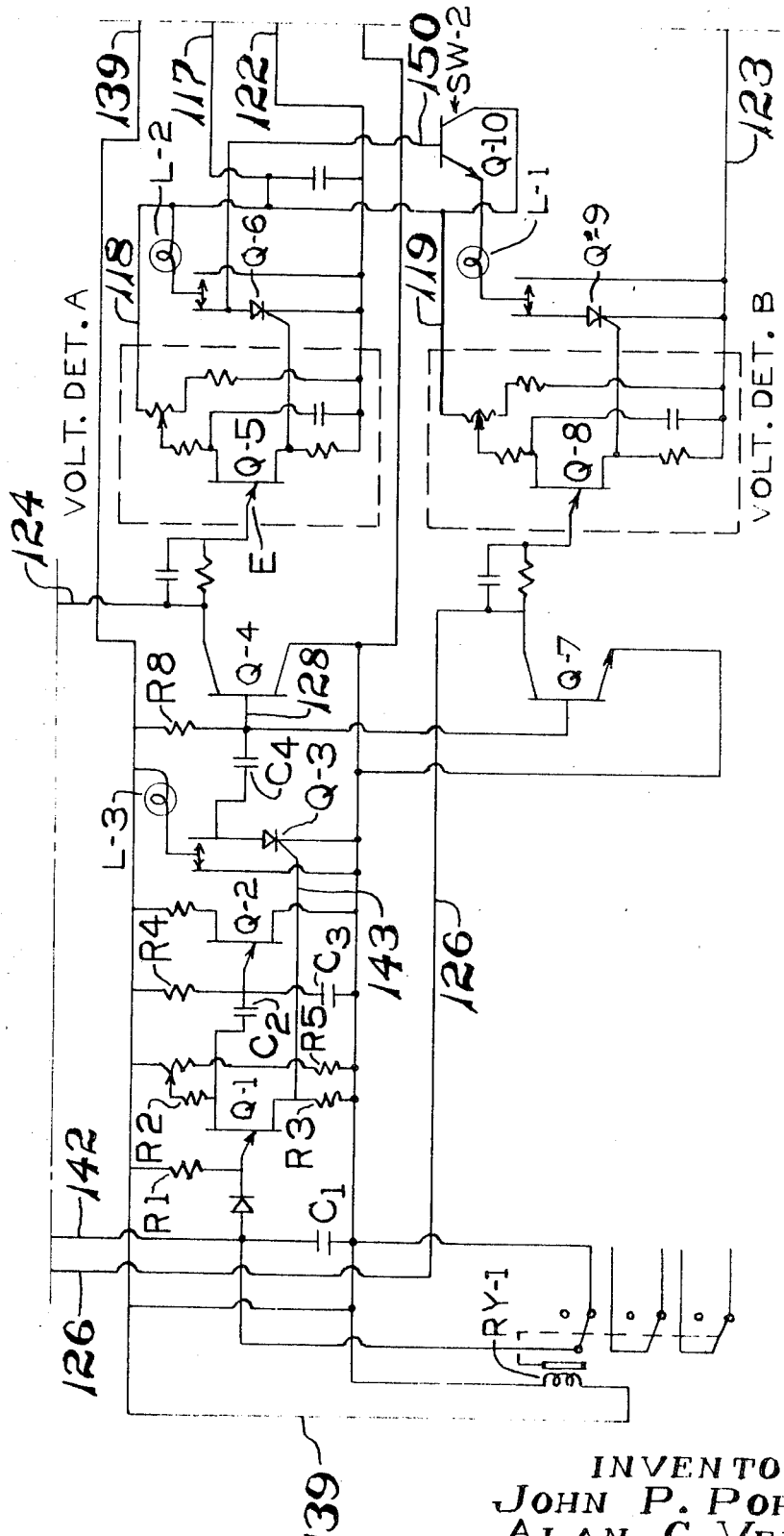

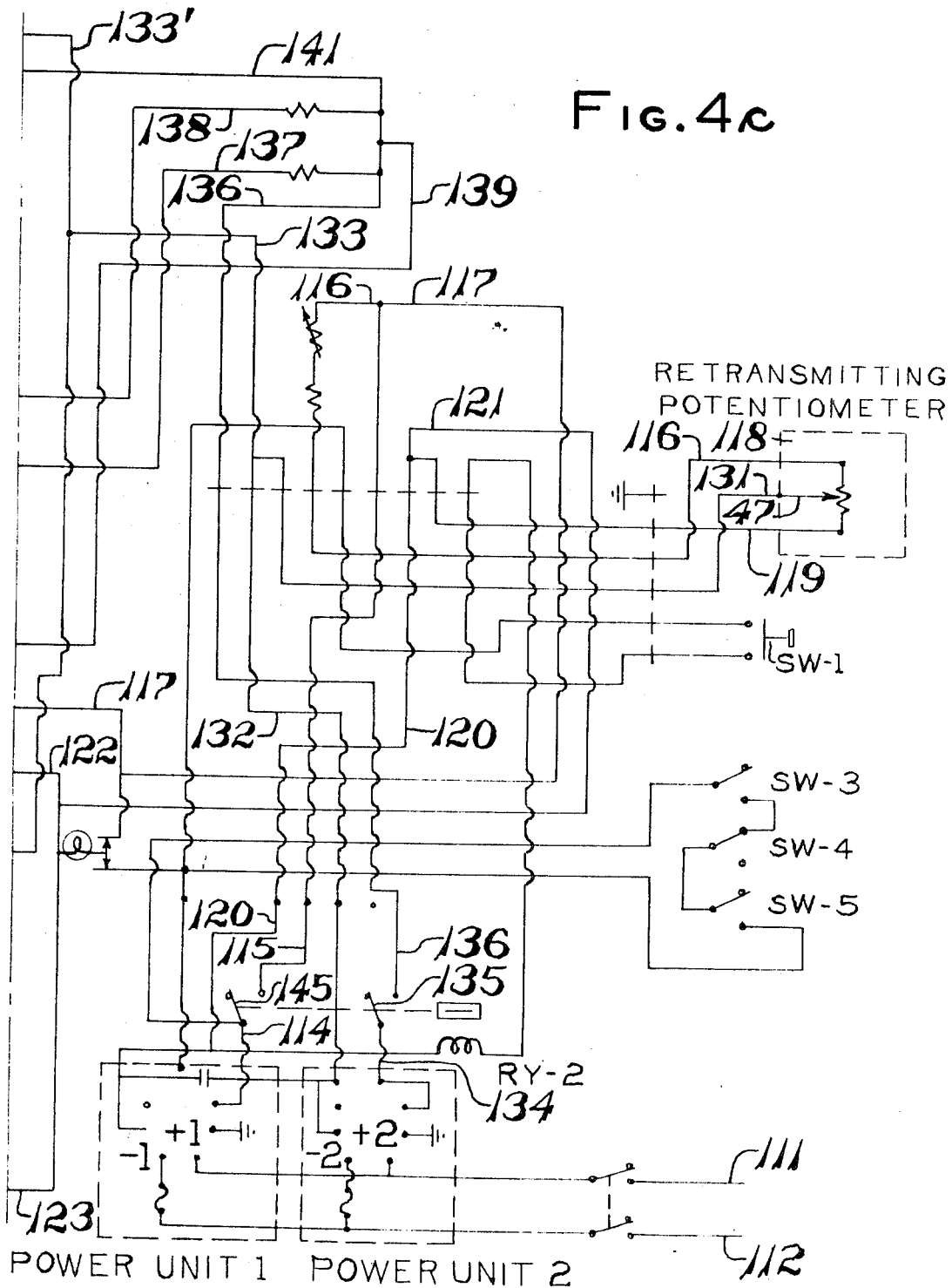

TEST INSTRUMENT FOR DETERMINING THE SHEAR MODULUS OF ELASTOMERIC MATERIALS

BACKGROUND OF THE INVENTION

This invention relates to the field of testing devices and more particularly to a testing device which gives indications of deviations of the characteristics of a material under test from a standard cure curve at a preselected point or points on a cure curve.

In the manufacture of elastomeric materials it is important to know the physical properties of the materials in order to knowledgeably control the manufacture of the finished products. This is important because the manufacturing must be based on the physical properties of the material being processed. In many fields, the variables of production are reduced to a minimum by the adherence to specifications of the various components used therein; however, in the field of manufacturing articles from elastomeric materials the additional problem is encountered that the properties of the materials must be controlled to greater degrees. This is because of the infinite number of compounds that manufacturers are able to make, and it has not been feasible for the rubber industry to supply data on them in handbook form. The most important uses for rubber are those requiring compounding of the basic hydrocarbons with various vulcanizing agents, softeners, reinforcing agents, fillers, and other materials with the following vulcanization or curing of this mixture into a homogeneous mass at given temperatures and time. In production the utilization of a particular batch of material makes it desirable to evaluate the cure rate curve of the material to effect economic runs. Such cure curve reveals many properties such as scorch time, optimum cure and cured modulus or stiffness properties. In the process of establishing control over production it would be desirable to provide an instrument that is reliable, versatile and operative to quickly provide an accurate test as well as one that is simple and useable by an unskilled operator.

A cure rate curve shows how the desired material properties develop with time as the material is heated.

SUMMARY OF THE INVENTION

The present invention provides a test instrument which accurately and rapidly measures the dynamic shear modulus properties of elastomeric materials and is operable to designate whether a sample of material is within acceptable tolerances by production workers without the requirement of interpreting data. Further, such invention provides means for facilitating the production worker to test a material by inserting a prepunched card into the controls of the device to ascertain whether the material under test meets preset standards. Such invention provides a prepunched card for each material in cooperation with the test device to check the limits of acceptability of the material under test. With the use of such cards the testing is performed automatically and eliminates the need for interpreting the data which would be time consuming, expensive and unworkable as a production tool.

The present invention contemplates the use of at least a pair of spaced members that are cooperative to define a cavity which houses a sample of material that is subjected to torsional strains, the resulting torsional forces are measured and fed to a control circuit which can plot the cure curve and/or designate acceptance of the test sample within preset limits either by a visible light system or on a printout chart. The circuit may be preset by a coded card which cards are keyed to different materials.

BRIEF DESCRIPTION OF THE DRAWINGS

FIGS. 4a, 4b, and 4c illustrate the control circuit for the test apparatus.

Referring to the drawings wherein like reference characters designate like or corresponding parts throughout the several views wherein there is shown in FIG. 1 a baseplate 10 having attached to its rearward end portion an upwardly extending backplate 11. Backplate 11 has an intermediately located horizontally extending elongated bracket 13 with a bore 14 located in the central portion thereof to receive a cylindrical member 15, which member 15 has a cylindrical recess 16 at the lower end portion thereof and provides a chamber to be described. Cylindrical member 15 has a passageway extending therethrough communicating cylindrical recess 16 with a conduit 18 which is adapted to be connected to a pressure source not shown. Mounted on brackets 13 are a pair of spaced cylinders 20 which have pistons therein with piston rods 22 extending through bores in such brackets for connection to a carrier member 25. Carrier member 25 has a conical-shaped recess 26 at its central portion adapted to receive a cone-shaped rotor 27 for a purpose to be described. Carrier member 25 is guided in its cylindrical upward and downward movement by a pair of spaced guide rods 29 which are secured to the baseplate 10 and bracket 13 respectively. Backplate 11 suitably journals for rotation the shaft 31 which is connected to a wheel member 33 for rotation therewith. As shown in FIG. 2, one end of a crank member 34 is mounted for connection to wheel member 33. Wheel 33 (FIG. 2) has a plurality of pin-receiving index holes 36, each at a different radial spacing from the vertical axis of wheel 33. An eccentric drive wheel 37 is mounted on an output shaft 38 of a variable speed motor 40. The other end portion of crank 34 is pivotably mounted to such eccentric drive wheel 37 to transfer the rotational movement of shaft 38 to an oscillating motion in wheel 33 and shaft 31. The amplitude of oscillation of wheel 33 is dependent on the particular mounting of the pin 35 in index hole 36, while the frequency of oscillation is dependent upon the output speed of motor 40. Suitable transmission means may be connected between the output shaft 38 and the variable speed motor 40 to provide a range of output speeds; however, for simplicity of illustration motor 40 is shown as directly connected to the output shaft 38.

Figure 1:
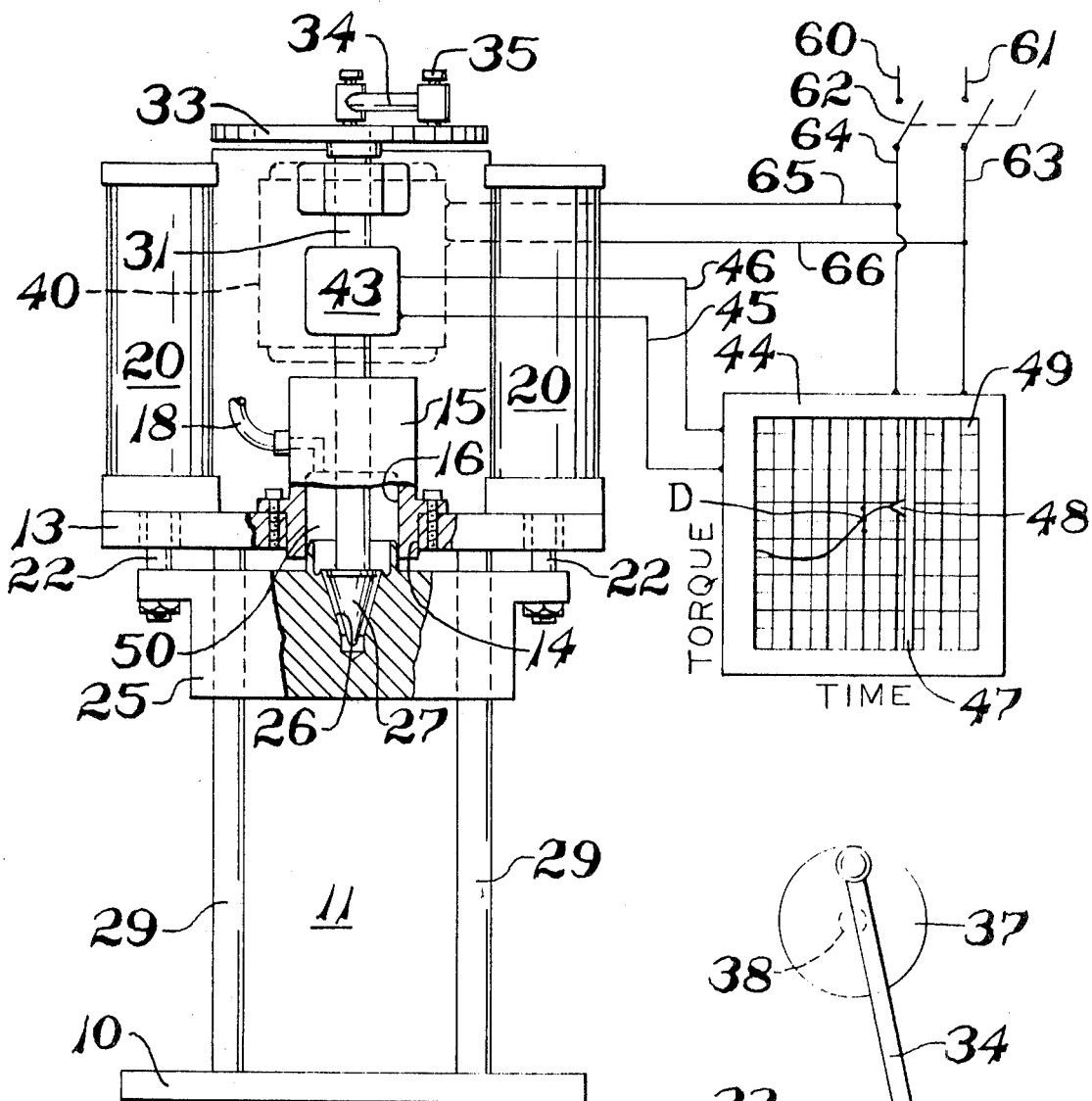
FIG. 1 is a schematic front-elevational view of the apparatus partly in section illustrating the relationship of the various control elements and a recorder with a chart disclosing a cure curve of torque versus time.

Shaft 31 extends downwardly for connection to the cone rotor 27 to provide the oscillation thereto. Mounted on shaft 31 is a torque-sensing pickup device 43 which responds to torque forces in shaft 31 to provide an output signal proportional to the torque developed which is conducted via electrical lines 45 and 46 to a recorder 44 which converts such signal to a smooth envelope signal for recording as depicted by the smooth curve on chart 49. Such a recorder 44 may accomplish this in a manner well known in the art as shown by U.S. Pat. No. 3,221,334 to Jones, which discloses a recorder in combination with integrator means for converting a rapidly fluctuating signal into a smooth envelope, the integrator means in its simplest form may be a combination of a rectifier and condenser as shown by U.S. Pat. No. 2,988,704 to Walker. Such recorder 44 has an arm 47 and pen 48 which graphically draws on the chart 49 the torque values as a function of time. The arm 47 of the recorder is used to operate a retransmitting potentiometer 118, more fully described hereinafter, which provides an output signal for use in the electrical circuit to be described. Such pickup device 43 may comprise a bonded resistance wire strain gauge well known in the art and therefore neither illustrated nor described in detail, wherein such wire gauges are bonded to the shaft 31 in such a position and are so connected into a bridge circuit that they cancel the effects of bending and thrust strain while adding the effects of torsional strain with the relation between the bridge unbalance and torsional strain being linear. Such pickup devices are manufactured by the Baldwin-Lima-Hamilton Company located in Waltham, Mass. The electrical power for the control operation is supplied by the electrical lines 60 and 61 which are connected to a source of electrical power not shown. A double-pole, single-throw switch 62 connects lines 60 and 61 to main control lines 63 and 64 which lead to the torque pickup recorder 44. Motor 40 receives its power supply from the lines 63 and 64 via branch lines 65 and 66. Suitable branch lines not shown are provided to supply current to a temperature control unit which in turn regulates the heating coils and the carrier member 25 to maintain a predetermined temperature on the sample located between the core cavity in such carrier member 25 and the cone rotor 27.

Figure 4A:
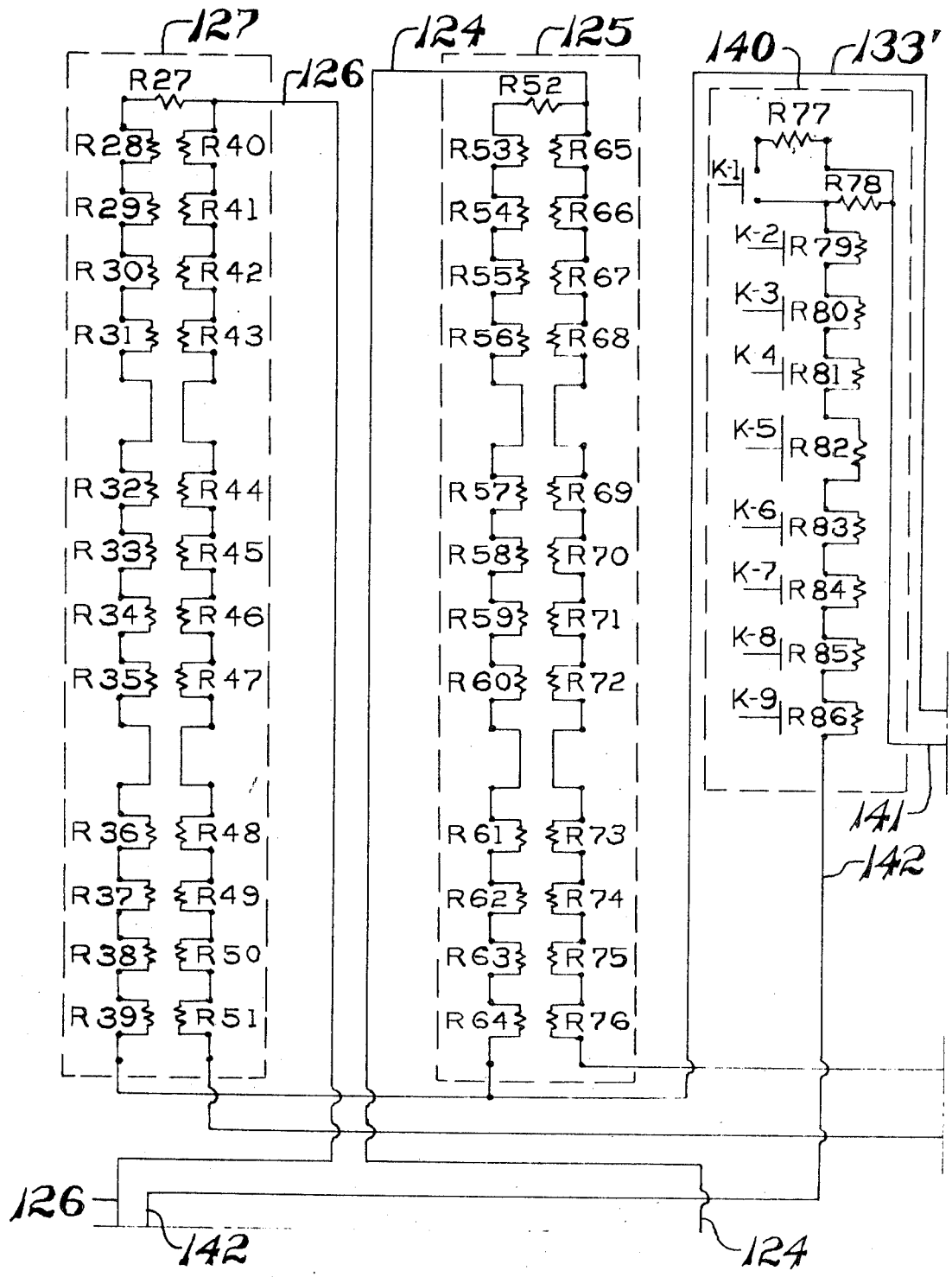

The electric control circuitry for the testing device is shown in FIGS. 4a, 4b and 4c. Power is supplied from a suitable source via conductors 111 and 112 to a power supply having units 1 and 2 which converts AC into DC current. Power unit 1 has a negative terminal (−1) and a positive terminal (+1) while power unit 2 has a negative terminal (−2) and a positive terminal (+2). Upon closing of the cavity 26 by movement of carrier member 25 into position with rotor 27 positioned therein, relays RY-1 and RY-2 are energized by a contact closure which in FIG. 4c is designated schematically as SW-1 in a manner well known in the art such that conductor 114 connects the positive terminal (+1) of power unit 01 with a conductor 115 which supplies current to branch conductors 116 and 117. This action automatically starts the test or monitoring action to be described by opening the contacts which short out capacitor $C_1$ adjacent to resistance R1 (FIG. 4b). Branch conductor 117 is connected to the positive terminals of Voltage Detector Units A and B via conductors 118 and 119 respectively. Such Voltage Detector Units are shown in dotted outline in FIG. 4b. Branch conductor 116 is connected to one terminal of a retransmitting potentiometer 118 to impress a voltage thereon with respect to the negative terminal which is connected via conductor 119 to branch conductors 120 and 121. Branch conductor 120 is connected to the negative terminal of power unit 1 whereas branch conductor 121 is connected to the negative terminals of Voltage Detector Unit A and Voltage Detector Unit B via conductors 122 and 123 respectively, by opening the contacts which short out capacitor $C_1$ adjacent to resistance R1 (FIG. 4b).

Voltage Detector Unit A is connected via conductor 124 to an upper limit set potentiometer 125 of a Gate Control device while Voltage Detector Unit B is connected via conductor 126 to a lower limit set potentiometer 127 of the Gate Control device. Voltage Detector Unit A employs a unijunction transistor Q-5 which is a three-terminal semiconductor device as is well known in the art. In normal operation one base of transistor Q-5 is grounded via conductor 122 to the negative terminal of power unit 1 with a positive bias voltage applied to the other base of transistor Q-5 via conductors 118, 117, and 115 from the positive terminal of power unit 1. In order to actuate transistor Q-5 so that it will initiate the comparison of the voltages to be described, a read circuit consisting of transistor Q-4, resistance R8 and capacitor $C_4$ must be conditioned such that transistor Q-4 becomes nonconductive. In the normal operation with bias being applied to transistor Q-4 via conductor 128 which is connected to the positive terminal of power unit 2 and with the emitter of transistor Q-4 connected to the negative terminal of power unit 2 via a conductor 133 then any output from conductor 124 to transistor Q-5 is shorted through transistor Q-4 to maintain transistor Q-5 nonconductive. Upon impressing a sufficient voltage to the gate of an SCR transistor Q-3, capacitor $C_4$ is discharged through Q-3 rendering transistor Q-4 nonconductive which in turn impresses the voltage from conductor 124 on the emitter of transistor Q-5 to render it conductive to pass a voltage therethrough for comparison purposes. Upon current passing therethrough, a voltage is impressed on transistor Q-6 to render it conductive and a flow of current from conductor 118 through lamp L-2 will flow through transistor Q-6 to conductor 122 which is connected to the negative terminal of power unit 1 thereby lighting up such lamp L-2. As stated above, if the voltage appearing at emitter E of transistor Q-5 is less than a preselected amount, as determined by design characteristics, the emitter E will be reverse biased and only a small emitter leakage current will flow. If the voltage becomes greater than the threshold value, the emitter E of transistor Q-5 will be forward biased and emitter current will flow and light up the red lamp L-2 indicating that the upper limits have been surpassed since the emitter E is connected via conductor 124 to the upper limit set potentiometers 125 of the gate control device. Voltage Detector Unit B acts in the same manner and upon sufficient voltage appearing at the emitter of unijunction transistor Q-8 from the lower limit set potentiometer 127, current will flow due to deactuation of transistor Q-7 which then lights up a green lamp L-1 indicating that the sample under test is within the tolerances or above the lower acceptable limits. In order to prevent the simultaneously lighting up of the lamp L-1 and L-2 a logic circuit including switch SW-2 as transistor Q-10 has its base connected to the anode of the transistor Q-6 while the collector is connected to the positive terminal of power unit 1 and the emitter connected to the lamp L-1. In lieu of the lamps L-1 and L-2 the output voltages may be connected to a printer such that in place of the signals being evident a direct reading in numerical values is obtained as a printout on a tape of paper indicating the value obtained. The advantage herein lies in the fact that by using a direct numerical reading the operator will be able to determine what material and quantity must be added to bring the material within tolerance of the specification.

The movable arm 47 operates as the movable arm on retransmitting potentiometer 118 (FIG. 4c) to provide an output voltage to conductor 131 that is dependent on the pen position which position is a function of the torque from the load cell 43. Conductor 131 is connected to conductors 132 and 133, with conductor 133 connecting via branch conductor 133' the upper and lower set potentiometers 125 and 127 to the negative terminal (−2) of power unit 2. The positive terminal of power unit 2 is connected via conductor 134, through contact 135 of relay RY-2 via conductor 136 to conductors 137, 138, and 139, with conductors 137 and 138 being connected to the input terminals of the lower and upper set potentiometers 127 and 125 respectively. The lower limit set potentiometer 127 is connected via conductor 137 to receive an input voltage from power supply unit 2 to impress a voltage across a plurality of resistances in series designated R27 through R51. The electrical conductor 126 connects the junction between resistors R27 and R40 of lower limit set potentiometer to the unijunction transistor Q-8 of voltage detector unit B. Upper limit set potentiometer 125 has a plurality of resistances R52 through R76 connected in series such that conductor 124 taken from between resistances R52 and R65 is connected to transistor Q-5 of voltage detector unit A to act as a voltage divider and controls the voltage therefrom to transistor Q-5.

A time base generator 140 consists of a plurality of resistances R77 through R86 in series includes capacitor $C_1$, transistor Q-1, Q-2, capacitors $C_2$, $C_3$ and resistors R1, R2, R3, R4, and R5. Resistances R77 through R86 are subject to being shorted out by a plurality of contacts K-1 through K-9, and is connected to the positive terminal of power unit 2 via conductors 141 and 136.

The output of the resistances R77 through R86 is connected via a conductor 142 to capacitor $C_1$ and the unijunction transistor Q-1 to provide an input signal thereto. A prepunched card presented to such time base generator 140 is operative to close certain of the contactors K-1 through K-9 to provide a preselected number of resistances in series which in cooperation with the capacitor $C_1$ provides a preselected time interval before transistor Q-1 becomes conductive and sends an electrical signal through conductor 143 to apply a positive bias to the gate of SCR transistor Q-3 to light up an amber light L-3 to indicate that the time period is ended and that a comparison of voltage is to be made. At this time a read pulse is generated by capacitor $C_4$ and resistance R8 which operates to turn off transistor Q-4 and Q-7 to permit the voltage output from lower and upper set potentiometers to be applied upon Voltage Detection Units A and B.

Such time base generator 140 and upper and lower limit set potentiometers 125 and 127 are preset by a card reader which is utilized in a circuit with the aid of a punched code card. The code cards are prepunched on the basis that the absence or presence of a hole, depending on function required, provides a contact actuation. Upon insertion of the prepunched code card into the card reader, the operator actuates a control mechanism which actuates all desired contacts simultaneously. Such card reader is manufactured by the Hickok Electrical Instrument Company, 10514 Dupont Avenue, Cleveland, Ohio, and AMP, Inc., of Harrisburg, Pa. The circuit assures the proper functioning of all contacts through switches SW-3, SW-4 and SW-5 which does not permit the unit to operate unless the coded card is positioned properly. In lieu of the prepunched cards which set the limits, a control device may be used which sets the limits by rotating a dial for controlling a limit at the time interval desired.

The circuit described only contains a single base time generator 140, and a single upper and lower limit set potentiometer for a single point on the cure curve to be checked, and it is desired to have several points checked as deemed necessary. If three points on the cure curve were to be checked, three separate time base generators would be used in cooperation with three separate upper and lower limit set potentiometers to provide three preselected time intervals which would compare the signal output from the pen position at the time under consideration with the appropriate upper and lower limits preset by the card reader.

In the operation of the apparatus described, the operator presents a prepunched card to the card reader, thereby closing certain of the contacts K-1 through K-9 of the time base generator 140 to set up the time interval such as to test whether the cure curve is within the limits as preset by a coded card that preconditions the limits on the upper and lower limit set potentiometers 125 and 127 respectively, as well as the other corresponding limit set potentiometers. The operator then presets and conditions carrier member 25 for the reception of a sample in the chamber by energizing the upper end portion of cylinders 20 which extend the respective piston rods 22 downwardly along with carrier member 25 such that a sample of material may be placed within such cavity 26. Through suitable control means the operator presets the temperature desired in such carrier member 25 and the operator then pressurizes the rod end of cylinder 20 while releasing the air pressure from the upper end portion of cylinders 20 which causes the carrier member 25 to move upwardly to the position shown in FIG. 1 such that the sample of material is confined between the rotor 27 and the wall of cavity 26. Such action closes switch SW-1 which energizes relays RY-2 to condition the circuit for operation which includes the oscillation of rotor 27 at an input of preset frequency and amplitude of oscillation by the energization of motor 40. Simultaneously with such action, a predetermined air pressure is maintained in the air pressure dome 50 which maintains the sample in the cavity defined by the rotor 27 and the walls of the cone-shaped bore 26 of the carrier member 25 to maintain a non-porous cure. The load cell 43 will provide an output signal which is converted to an envelope signal as previously described and then recorded on the recorder 44 via the moving arm 47, which arm 47 is shown in FIGS. 1 and 4c. Thus, a position of the arm 47 and the pen 48 is a function of the torque of torque cell 43 which provides a variable input signal to the retransmitting potentiometer 118.

With relay RY-2 energized, contacts 135 and 145 connect the positive terminals of power supply units 2 and 1 with conductors 136 and 115 respectively. Closing of contact 145 impresses a control voltage on the retransmitting potentiometer 118 and the Voltage Detectors A and B as well as their corresponding lamp indicators L-1 and L-2. With contact 145 closed the potentiometer arm 47 on retransmitting potentiometer 118 acting as a voltage divider impresses a voltage via conductors 131, 132, (power unit 2), 136, 137, 138 to the upper and lower limit set potentiometers 125 and 127, which in turn acting as preset voltage dividers impresses a controlled voltage via conductors 124 and 126 to the emitters of transistors Q-5 and Q-8 of Voltage Detector Units A and B. With contact 135 closed, the time base generator 140 is set into operation such that upon the proper preset lapse of time transistor Q-1 becomes conductive and lights up amber lamp L-3 indicating that the control and testing circuit is operating at the designated time interval to check the cure curve, such that at the precise time Voltage Detector Units A and B are conditioned for operation. If the voltage appearing at the collector of Q-4 is sufficiently high it will trigger transistor Q-5 and light up lamp L-2 indicating that the position of pen 48 is above the preset limits of the cure curve found to be desirable. Whereas, if the voltage appearing at the collector of transistor Q-7 is sufficiently high to exceed the threshold value of Q-8 then the green lamp L-1 will light up through Q-9 and the operator knows that the sample of material is within the preset range of limits set. If the pen position is such that insufficient voltage is impressed across lower limit set potentiometer 127 then the green lamp L-1 will not light up and only the amber light L-3 will be on indicating that the circuit is operating but that the point of the cure curve being checked is below the lower limits of the cure curve. As explained above the read circuit controls the time when the comparison of voltages is to be made through the applying of bias voltage to the gate of SCR transistor Q-3 which acts to turn off transistors Q-4 and Q-7 to permit the voltage applied from lower and upper set potentiometers 127 and 125 to voltage detector units A and B.

Figure 3:
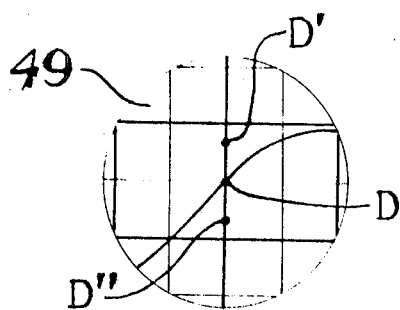
FIG. 3 is an enlarged view of a portion of the chart shown in FIG. 2 illustrating the preset limits with respect to the cure curve.
Figure 2:
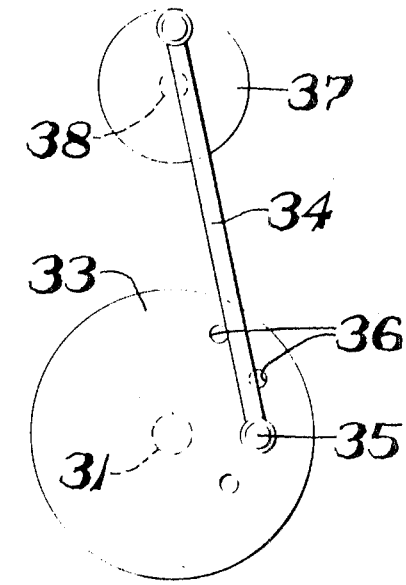
FIG. 2 is a plan view of the connection between the drive wheels for oscillating the test plate.

Assuming that point D is the point to be checked as depicted in FIGS. 1 and 3, with point D' being the upper limit and point D'' representing the lower limit. When the pen 48 reaches point D the read circuit permits the comparison of the voltage from the retransmitting potentiometer 118 to be compared with the upper limit D' as determined by the upper limit set potentiometer 127 and the lower limit D'' as determined by lower limit set potentiometer 125. If the point D should be below the voltage of the lower limit D'' then neither L-1 nor L-2 will be lit. If the point D should be above D', then transistor Q-6 becomes conductive and current flows from conductor 118 through lamp L-2 which visually displays a red light with such current flowing through SCR transistor Q-6 to conductor 122 such that transistor Q-10 becomes nonconductive since conductor 150 between transistors Q-10 and Q-6 now is shorted through transistor Q-6, therefore lamp L-1 connected to transistor Q-10 cannot receive any current. In the event that the voltage impressed by arm 47 and pen 48 is such that point D is between points D' and D'' as depicted by FIG. 3 then transistors Q-4 and Q-7 become nonconductive as explained so that transistors Q-5 and Q-8 can divert the outputs from upper and lower limit set potentiometers 125 and 127 such that with the voltage from the upper limit set potentiometer less than sufficient to trigger transistor Q-5 only transistor Q-8 becomes conductive. In this case the voltage from conductor 118 will be impressed only through lamp L-1 thereby lighting up the green lamp only.

This operation is repeated at other designated or preset points on the cure curve being traced or generated by another time base generator similar to time base generator 140 but having a different time interval which checks the voltage as impressed by the pen position relative to other preset upper and lower limits similar to units 125 and 127 which in turn operate to light up corresponding red or green lights to visually designate whether the sample is within specified tolerances. This operation may be repeated as many times as desired to check numerous points on the cure curve being generated. It is to be understood that in lieu of lamps L-1 and L-2 the output voltage of the arm 47 and pen 48 from the retransmitting potentiometer may be used to control a numeral value print out of the values thereby giving a direct reading of the values at the points on the cure curve which are to be compared with the standard values of a standard cure curve.

Obviously many modifications and variations of the present invention are possible in the light of the above teachings. It is therefore to be understood, that within the scope of the appended claims, the invention may be practiced otherwise than as specifically claimed.

We claim:

1. A testing apparatus for determining the acceptability of a sample within predetermined limits of a standard cure curve comprising: a material confining means including two separable portions, said portions cooperative to define a chamber therebetween for receiving a sample of test material, drive means operatively connected to said material confining means for imposing oscillating shearing stresses on said confined material, means for measuring the variations in torque to provide an electrical output signal from variations in shearing stresses on said sample of material, envelope circuit means for receiving and converting said output signal to an envelope signal that is the peaks of said output signal, circuit means having preset voltage limit means, said circuit means being operatively connected to receive and compare said envelope signal at preselected time intervals with said preset voltage limits at spaced time intervals along a cure curve to provide a comparison therebetween, indicator means operatively connected to said circuit means and responsive to said comparison to indicate whether said envelope signal falls within or outside of said voltage limits.

2. A testing apparatus as set forth in claim 1 wherein said voltage limit means includes upper and lower limits.

3. A device for monitoring a cure of a sample of material comprising: means for creating an electrical output signal that is proportional to torque forces as a function of time and thermal cure of a material, a plurality of comparison circuits, each comparison circuit having an upper and lower voltage limit, means operatively connected to said comparison circuit for simultaneously setting said upper and lower voltage limits, a time control circuit operative to actuate said read circuit, said comparison circuits operative upon actuation to receive said output signal to compare said signal with said preset limits, each of said comparison circuits including a visual display means, visual indicator means, timing circuit means operative to actuate said comparison circuits in sequential time spaced intervals cooperating with said visual indicator means to provide a visual indication of acceptance or rejection on said visual indicator at preselected time intervals.

4. A monitoring device as set forth in claim 3 wherein said comparison circuits include a card reader operative to preset said upper and lower voltage limits in accordance with the punched data on a card for use with said card reader.

5. A monitoring device as set forth in claim 4 wherein said visual indicator means includes a printer for registering the numerical value of said output signal.

6. An instrument for testing a characteristic of a material which varies with time from the start of an operation on the material, said characteristic having upper and lower limits of acceptability which vary with time, program means having stored therein the upper and lower limits of acceptability for said characteristic at a particular time from the start of said operation and the time from the start of the operation at which the characteristic of said material is to be within said limits, signal means providing a first signal which varies in accordance with said characteristic, circuit means connected to said signal means for signaling when said signal is above a presettable upper level and when it is below a presettable lower level, said circuit means comprising means responsive to said program means for setting said levels and control means actuatable in response to a timing signal to render said circuit means effective to compare an input signal with said levels and to indicate its relationship thereto, means connecting said signal means to said circuit means whereby said first signal is applied as said input signal to said circuit means, timing means for providing said timing signal a predetermined time after being actuated by an actuating signal, said timing means including means responsive to said program to determine the time interval between said actuating signal and the timing signal, means connecting said timing means to actuate said control means, and initiating means for supplying said actuating signal to said timing means at the start of said operation.

7. In an instrument as defined in claim 6 wherein said circuit means comprises first and second voltage level detectors, each being actuated in response to a voltage above a respective predetermined level, said first voltage detector being actuated when said first signal has a voltage magnitude corresponding to the lower limit and said second voltage detector being actuated when said output signal has a higher magnitude corresponding to said upper limit.

8. In a testing instrument as defined in claim 7 wherein said circuit means comprises means responsive to said program means for applying preselected portions of said first signal which are different to said voltage detectors.

9. In a testing instrument as defined in claim 6 wherein said signal means comprises a voltage dividing circuit, reference potential means connected across said voltage dividing circuit, said voltage dividing circuit including adjustable means providing a voltage output which is a portion of said reference potential across said voltage dividing circuit, and means to vary said adjustable means in accordance with said characteristic, said voltage output constituting said first signal.

10. In a testing instrument as defined in claim 9 wherein said means in said circuit means responsive to said program means comprises means settable in response to said program to apply a first selected portion of said output voltage to one of said voltage detectors and a second preselected portion of said output voltage to said second voltage detector.

11. In a testing instrument for indicating whether or not the heat curing characteristics of an elastomer is within preselected limits comprising a motor operable to effect the testing of a sample of the material, means for creating an electrical output signal that is dependent on the viscosity of the material being tested, the viscosity and said electrical output signal normally varying with time from the start of testing and the acceptable limits for said signal varying with time, a plurality of comparison circuits, each comparison circuit having presettable upper and lower limits, respective means for actuating said comparison circuits to compare said electrical output signal with the preset limits for the circuit, program means for storing data indicating upper and lower limits for said signal at predetermined times with respect to the initiation of the curing operation and data indicating the time that the signal is to be within the stored limits, each of said comparison circuits comprising means responsive to said program means for setting the respective limits for the signal for a particular time, respective timing means for actuating each of said comparison circuits, each of said timing means including means set in response to said program means to set the timing means to provide a timing signal for the corresponding comparison circuit at a predetermined time after receiving an actuating signal, and means responsive to the start of the testing operation for applying an actuating signal to each of said timing means, and means for applying the timing signal from each of the said timing means to the respective comparison circuit to actuate the latter.

12. In a testing instrument as defined in claim 11 wherein each of said comparison circuits comprises first and second voltage detectors each having a fixed threshold level, and means responsive to said program means to apply different preselected portions of said electrical output signal to said voltage detectors.

13. An instrument for testing the characteristics of a material from a curve at preselected points on such a curve comprising: means for creating an output signal that is proportional to torque forces as a function of time and thermal cure of a material, a comparison circuit having preset limits of acceptability, said comparison circuit having a read circuit and a voltage detector circuit, said comparison circuit includes an upper and lower set potentiometer connected between said output signal and said voltage detector circuit, each of said set potentiometers having a plurality of resistances connected in series, time control means operative to actuate said comparison circuit at preset time intervals for comparing said output signal with said preset limits, said time control means being a time base generator in series with a capacitor and a unijunction transistor operative to actuate said read circuit, said time base generator having a plurality of resistances connected in series and subject to being shorted out by a plurality of contacts being operative selectively by a prepunched card which selects the combination of said contacts which preselects the number of said resistances in series to provide a preselected time interval to actuate said read circuit, said voltage detector means operative upon actuation of said read circuit to compare said output signal with said upper and lower set potentiometers, and visual display means responsive to the comparison by said voltage detector means of said output signal with said preset limits of said upper and lower set potentiometers to indicate whether said output signal is within said limits at said preset time intervals.